（12) United States Patent
Yu (10) Patent No.: US 12,556,121 B2
(45) Date of Patent: Feb. 17, 2026

(54) DEVICE FOR CONTROLLING MOTOR FOR VEHICLE

(71) Applicant: HL MANDO CORPORATION, Pyeongtaek-si (KR)

(72) Inventor: Minhye Yu, Uiwang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 189 days.

(21) Appl. No.: 18/385,087

(22) Filed: Oct. 30, 2023

(65) Prior Publication Data

US 2024/0322728 A1    Sep. 26, 2024

(30) Foreign Application Priority Data

Mar. 21, 2023    (KR) .................. 10-2023-0036728

(51) Int. Cl.
*H02P 27/06*    (2006.01)
*B60T 13/74*    (2006.01)
*H02P 23/14*    (2006.01)

(52) U.S. Cl.
CPC ............ *H02P 27/06* (2013.01); *B60T 13/745* (2013.01); *H02P 23/14* (2013.01); *B60T 2250/04* (2013.01)

(58) Field of Classification Search
CPC .... B60L 3/003; B60L 3/0061; B60L 2220/12; B60L 2220/14; B60L 2220/16; B60L 2220/58; B60L 15/20; B60L 2240/421; B60L 2210/40; B60L 2240/12; B60L 2240/443; B60L 2240/527; B60L 2240/529; B60L 3/04; B60L 2240/441; B60L 2250/26; B60L 50/51; B60L 7/14; B60L 15/2009; B60L 3/0038; B60L 2240/427; B60L 2240/429; H02K 11/27; H01L 2924/13055; H01L 2924/13091; H02P 25/22; H02P 27/06; H02P 27/08; H02P 29/024; H02P 21/22; H02P 29/032; H02P 6/085; H02P 29/0241; H02P 2203/03; H02P 29/028; H02P 6/16; H02P 6/28; B62D 5/046; B62D 5/0484; B62D 5/0487; B62D 5/049; B62D 5/0493; B60T 2270/403; B60T 2270/402; B60T 13/745

See application file for complete search history.

(56) References Cited

U.S. PATENT DOCUMENTS

2018/0208236 A1*   7/2018   Asao ................... H02P 29/0241

FOREIGN PATENT DOCUMENTS

KR    10-2022-0006015 A    1/2022

* cited by examiner

*Primary Examiner* — Antony M Paul
(74) *Attorney, Agent, or Firm* — Harvest IP Law, LLP (57) ABSTRACT

A device for controlling a motor for a vehicle is disclosed. The device may include: a first inverter for supplying power to a first winding wound to the motor; a second inverter for supplying power to a second winding wound to the motor; a motor position sensor for detecting at least one of a rotational position or a rotational speed of the motor by being mounted to the motor; a current sensor for detecting at least one of a current output from the first inverter to the motor or a current output from the second inverter to the motor; a first controller for controlling the first inverter; and a second controller for controlling the second inverter.

9 Claims, 4 Drawing Sheets

DEVICE FOR CONTROLLING MOTOR FOR VEHICLE

CROSS-REFERENCE TO RELATED APPLICATION

The present application claims the benefit of priority to Korean Patent Application No. 10-2023-0036728, filed on Mar. 21, 2023 in the Korean Intellectual Property Office, the entire disclosures of which is incorporated herein by reference.

TECHNICAL FIELD

The present disclosure relates to a device for controlling a motor for a vehicle, and more particularly, to a motor control device for a vehicle for controlling a double winding motor which may be mounted in a brake device of a vehicle or the like.

BACKGROUND

Recently, brake systems are widely used to recognize displacement of a brake pedal of a vehicle and generate a corresponding brake hydraulic pressure by a hydraulic pump and thus supply it to the brake. This braking systems allow a driver to omit a booster that amplifies the force of stepping on the brake pedal, and facilitates implementation of driver assistance, autonomous driving, and the like.

A double winding motor may be used for the hydraulic pump. The dual winding motor includes a first winding and a second winding, and each winding may be powered through a different inverter. In this case, each inverter may be controlled based on detection information of a motor position sensor mounted in the motor, detection information of a current sensing module for a current flowing from the inverter to the motor, and the like. In this regard, in the case of detecting using a motor position sensor, the price and arrangement space of the sensor is a problem, and in the case of detecting through a current sensing module, there is a problem that it is difficult to trust when the speed of the motor is low.

Meanwhile, the inverter for supplying power to the first winding and the inverter for supplying power to the second winding are each controlled by a separate controller. When two controllers are adopted as described above, redundancy needs to be effectively implemented so that a motor output above a predetermined level can be generated even if a failure occurs in any one of the two controllers.

The information disclosed in the Background section above is to aid in the understanding of the background of the present disclosure, and should not be taken as acknowledgement that this information forms any part of prior art.

SUMMARY

One aspect of the present disclosure is directed to a device for controlling a motor for a vehicle with high economy and high accuracy in controlling an inverter for supplying power to a motor.

Another aspect of the present disclosure is directed to a device for controlling a motor for a vehicle that effectively achieves redundancy in controlling a double winding motor.

The scope of the present disclosure is not limited to the above-described aspects, and other aspects that are not mentioned will be able to be clearly understood by those skilled in the art to which the present disclosure pertains from the following description.

According to an aspect of the present disclosure, there is provided a device for controlling a motor for a vehicle including a first inverter for supplying power to a first winding wound to the motor; a second inverter for supplying power to a second winding wound to the motor; a motor position sensor for detecting at least one of a rotational position or a rotational speed of the motor by being mounted to the motor; a current sensor for detecting at least one of a current output from the first inverter to the motor or a current output from the second inverter to the motor; a first controller for controlling the first inverter; and a second controller for controlling the second inverter. The first controller is configured to generate a first control signal based on the at least one of the rotational position or the rotational speed of the motor detected by the motor position sensor, and the second controller is configured to generate a second control signal based on the at least one of the current output from the first inverter to the motor or a current output from the second inverter to the motor detected by the current sensor, the first controller and the second controller are configured to communicate with each other, and the first controller and the second controller are configured to respectively control the first inverter and the second inverter depending on the first control signal or to respectively control the first inverter and the second inverter depending on the second control signal.

In the device for controlling a motor for a vehicle according to an aspect of the present disclosure, in a first condition, the first controller and the second controller may be configured to respectively control the first inverter and the second inverter depending on the first control signal, and in a second condition, the first controller and the second controller may be configured to respectively control the first inverter and the second inverter depending on the second control signal.

In the device for controlling a motor for a vehicle according to an aspect of the present disclosure, the first condition and the second condition may be related to a speed of the motor.

In the device for controlling a motor for a vehicle according to an aspect of the present disclosure, the first condition may include a case in which the speed of the motor is less than a reference speed of the motor, and the second condition may include a case in which the speed of the motor is greater than or equal to the reference speed of the motor.

In the device for controlling a motor for a vehicle according to an aspect of the present disclosure, the reference speed of the motor may be set at any speed ranging from 5% to 15% of a rated speed of the motor.

In the device for controlling a motor for a vehicle according to an aspect of the present disclosure, the reference speed of the motor may be set at 10% of a rated speed of the motor.

In the device for controlling a motor for a vehicle according to an aspect of the present disclosure, the first condition and the second condition may be related to a driving speed of the vehicle.

In the device for controlling a motor for a vehicle according to an aspect of the present disclosure, the first condition may include a case in which the driving speed of the vehicle is less than a reference driving speed, and the second condition may include a case in which the driving speed of the vehicle is greater than or equal to the reference driving speed.

In the device for controlling a motor for a vehicle according to an aspect of the present disclosure, the reference driving speed may be set to 50 km or more.

The device for controlling a motor for a vehicle according to an aspect of the present disclosure may further include a shock sensor for detecting an impact force applied to the motor position sensor.

In the device for controlling a motor for a vehicle according to an aspect of the present disclosure, the first condition may include a case in which the impact force detected by the shock sensor is less than a reference impact value, and the second condition may include a case in which the impact force detected by the shock sensor is greater than or equal to the reference impact value.

According to another aspect of the present disclosure, there is provided a device for controlling a motor for a vehicle including: a first inverter for supplying power to a first winding wound to the motor; a second inverter for supplying power to a second winding wound to the motor; a motor position sensor for detecting at least one of a rotational position or a rotational speed of the motor by being mounted to the motor; a current sensor for detecting at least one of a current output from the first inverter to the motor or a current output from the second inverter to the motor; a first controller for controlling the first inverter; a second controller for controlling the second inverter; and an output controller for determining whether the first controller and the second controller fail and adjust outputs of the first winding and the second winding, wherein the first controller may be configured to generate a first control signal based on the at least one of the rotational position or the rotational speed of the motor detected by the motor position sensor, and the second controller may be configured to generate a second control signal based on the at least one of the current output from the first inverter to the motor or a current output from the second inverter to the motor detected by the current sensor, and the first controller and the second controller are configured to communicate with each other, and the first controller and the second controller may be configured to respectively control the first inverter and the second inverter depending on the first control signal or to respectively control the first inverter and the second inverter depending on the second control signal.

In the device for controlling a motor for a vehicle according to another aspect of the present disclosure, in response to determining that any one of the first controller or the second controller fails and the other one of the first and second controllers is normal, the output controller may generate an output adjustment signal to increase the output of the first or second winding powered by the first or second inverter controlled by the normal controller.

In the device for controlling a motor for a vehicle according to another aspect of the present disclosure, the output controller accumulatively may store failure rates of the first controller and the second controller during a predetermined period.

In the device for controlling a motor for a vehicle according to another aspect of the present disclosure, the output controller may adjust an output sharing ratio of the first controller and the second controller depending on the failure rates of the first controller and the second controller after the lapse of the predetermined period.

In the device for controlling a motor for a vehicle according to another aspect of the present disclosure, the output controller may adjust the output sharing ratio of the first controller and the output sharing ratio of the second controller in proportion to a difference between the failure rates of the first controller and the second controller after the lapse of the predetermined period.

In the device for controlling a motor for a vehicle according to another aspect of the present disclosure, in a first condition, the first controller and the second controller may be configured to respectively control the first inverter and the second inverter depending on the first control signal, and in a second condition, the first controller and the second controller may be configured to respectively control the first inverter and the second inverter depending on the second control signal.

In the device for controlling a motor for a vehicle according to another aspect of the present disclosure, the first condition and the second condition may be related to a speed of the motor.

In the device for controlling a motor for a vehicle according to another aspect of the present disclosure, the first condition may include a case in which a speed of the motor is less than a reference speed of the motor, and the second condition may include a case in which a speed of the motor is greater than or equal to the reference speed of the motor.

In the device for controlling a motor for a vehicle according to another aspect of the present disclosure, the motor reference speed may be set at 5 to 15% of a rated speed of the motor.

In the device for controlling a motor for a vehicle according to another aspect of the present disclosure, the first condition and the second condition may be related to a driving speed of the vehicle.

In the device for controlling a motor for a vehicle according to another aspect of the present disclosure, the first condition may include a case in which a driving speed of the vehicle is less than a reference driving speed, and the second condition may include a case in which a driving speed of the vehicle is greater than or equal to the reference driving speed.

In the device for controlling a motor for a vehicle according to another aspect of the present disclosure, the reference driving speed may be set to 50 km or more.

In the device for controlling a motor for a vehicle according to another aspect of the present disclosure may further include a shock sensor configured to detect an impact force applied to the motor position sensor.

In the device for controlling a motor for a vehicle for a vehicle according to another aspect of the present disclosure, the first condition may include a case in which the impact force detected by the shock sensor is less than a reference impact value, and the second condition may include a case in which the impact force detected by the shock sensor is greater than or equal to the reference impact value.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 1:
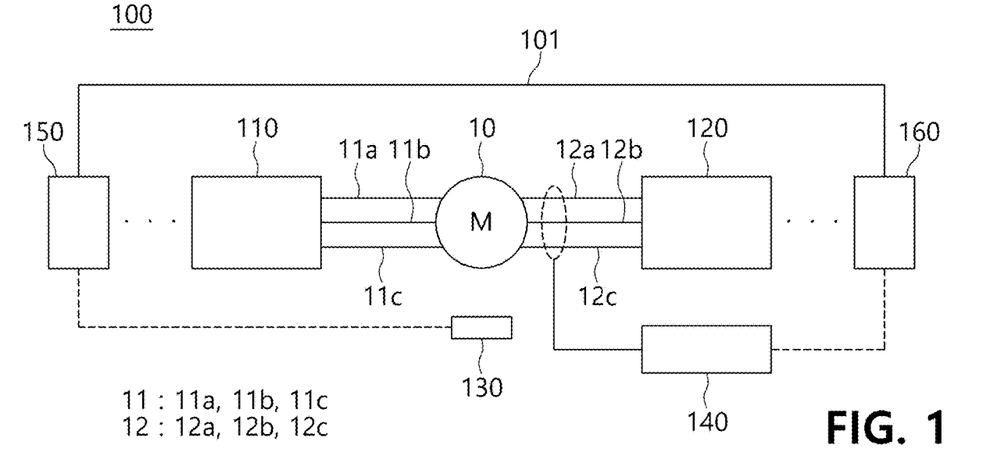
FIG. 1 is a diagram showing a configuration of a device for controlling a motor for a vehicle according to an exemplary embodiment of the present disclosure.

FIG. 1 is a diagram showing a configuration of a device for controlling a motor for a vehicle according to an exemplary embodiment of the present disclosure.

The device 100 for controlling a motor for a vehicle according to an exemplary embodiment of the present disclosure controls a motor 10. In this case, the motor 10 may include a first winding 11 and a second winding 12 as a double winding motor. For example, the motor 10 may be a three-phase motor. More specifically, the motor 10 may be a three-phase BLAC motor, but is not limited thereto.

Meanwhile, the motor 10 may be mounted to generate hydraulic pressure in a hydraulic pump that supplies hydraulic pressure to a brake. Specifically, the motor 10 may generate power to move a hydraulic piston in a pressure chamber in which a fluid providing braking hydraulic pressure is stored. A rotational driving force of the motor 10 may be converted into a linear driving force for linearly moving the hydraulic piston and then supplied to the hydraulic piston.

Referring to FIG. 1, the device 100 for controlling a motor for a vehicle according to an exemplary embodiment of the present disclosure may include a first inverter 110, a second inverter 120, a motor position sensor 130, a current sensor 140, a first controller 150, and a second controller 160.

The first inverter 110 supplies power to the first winding 11 wound to the motor 10. Here, the first winding 11 may include a first U-phase 11A, a first V-phase 11B, and a first W-phase 11C. The first inverter 110 may supply a first three-phase AC to the first U-phase 11A coil, the first V-phase 11B coil, and the first W-phase 11C coil. More specifically, the first inverter 110 may include a switch (not shown) for checking a current supplied to the first U-phase 11A coil, a switch (not shown) for checking a current supplied to the first V-phase 11B coil, and a switch (not shown) for checking a current supplied to the first W-phase 11C coil. Meanwhile, the first inverter 110 may convert power supplied from the battery of the vehicle and supply the converted power to the first winding 11.

The second inverter 120 supplies power to the second winding 12 wound to the motor 10. The second winding 12 may include a second U-phase 12A, a second V-phase 12B, and a second W-phase 12C. The second inverter 120 may supply second three-phase AC to the second U-phase 12A coil, the second V-phase 12B coil, and the second W-phase 12C coil. More specifically, the second inverter 120 may include a switch (not shown) for checking a current supplied to the second U-phase 12A coil, a switch (not shown) for checking a current supplied to the second V-phase 12B coil, and a switch (not shown) for checking a current supplied to the second W-phase 12C coil. Meanwhile, the second inverter 120 may convert power supplied from the battery of the vehicle and supply the converted power to the second winding 12.

Meanwhile, in an exemplary embodiment of the present disclosure, a battery for supplying power to the first inverter 110 and a battery for supplying power to the second inverter 120 may be separately provided. That is, the first inverter 110 and the second inverter 120 may receive power from different batteries and thus may increase reliability of operation.

The motor position sensor 130 may be mounted on the motor 10 to detect at least one of a rotational position or a rotational speed of the motor 10. The motor position sensor 130 may include a magnet (not shown). In addition, the motor position sensor 130 may be mounted on a printed circuit board (PCB) mounted adjacent to the motor 10. More specifically, the motor position sensor 130 may be mounted adjacent to the rotor on the rotation axis of the motor 10.

The current sensor 140 may detect at least one of a current output from the first inverter 110 to the motor 10 or a current output from the second inverter 120 to the motor 10. The current sensor 140 may be configured as a circuit for amplifying or computing a continuous analog signal. For example, the current sensor 140 may include an operational amplifier (OP AMP). In addition, the current sensor 140 may include a shunt resistor which is a resistor used to measure current.

In an exemplary embodiment of the present disclosure, the current sensor 140 may be mounted to detect a current output from the second inverter 120 to the motor 10. In more detail, the current sensor 140 may detect the current output from the second inverter 120 to the motor 10, that is, the second three-phase AC current supplied to the second U-phase 12A coil, the second V-phase 12B coil, and the second W-phase 12*c* coil.

The first controller 150 and the second controller 160 of the device 100 according to an exemplary embodiment of the present disclosure each may be a processor (e.g., computer, microprocessor, CPU, ASIC, circuitry, logic circuits, etc.). Each of the controllers 150, 160 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The first controller 150 controls the first inverter 110. When the first inverter 110 includes a switch for checking a current supplied to the first U-phase 11A coil, a switch for checking a current supplied to the first V-phase 11B coil, and a switch for checking a current supplied to the first W-phase 11C coil, the first controller 150 may turn on and off each switch included in the first inverter 110 in accordance with timing.

In an exemplary embodiment of the present disclosure, the first controller 150 may generate a first control signal based on the information detected by the motor position sensor 130. That is, the first controller 150 may be connected to the motor position sensor 130 to receive detection information from the motor position sensor 130 and generate the first control signal based on the received detection information of the motor position sensor 130. Here, the first control signal means a signal for controlling the first inverter 110 or the second inverter 120.

The second controller 160 controls the second inverter 120. When the second inverter 120 includes a switch for checking a current supplied to the second U-phase 12A coil, a switch for checking a current supplied to the second V-phase 12B coil, and a switch for checking a current supplied to the second W-phase 12C coil, the second controller 160 may turn on and off each switch included in the second inverter 120 in accordance with timing.

In an exemplary embodiment of the present disclosure, the second controller 160 may generate a second control signal based on information detected in the current sensor 140. In other words, the second controller 160 may be connected to the current sensor 140 to receive detection information of the current sensor 140 and generate the second control signal based on the received detection information of the current sensor 140. Here, the second control signal means a signal for controlling the first inverter 110 or the second inverter 120.

The first controller 150 and the second controller 160 may communicate with each other. In other words, the first controller 150 and the second controller 160 may transmit and receive signals to and from each other. In an exemplary embodiment of the present disclosure, the first controller 150 and the second controller 160 may be connected each other by a communication line 101. For example, the communication line 101 may be a controller area network (CAN) of a vehicle. Further, the communication line 101 may be a wire of communication directly connecting the first controller 150 and the second controller 160.

In an exemplary embodiment of the present disclosure, the first controller 150 and the second controller 160 may respectively control the first inverter 110 and the second inverter 120 depending on the first control signal. Further, the first controller 150 and the second controller 160 may respectively control the first inverter 110 and the second inverter 120 depending on the second control signal.

Controlling the first inverter 110 and the second inverter 120 depending on the first control signal and controlling the first inverter 110 and the second inverter 120 depending on the second control signal will be described in more detail below.

In a first case, both the first inverter 110 and the second inverter 120 may be controlled based on the first control signal. As described above, the first controller 150 generates the first control signal based on detection information of the motor position sensor 130. At this time, the first controller 150 may control the first inverter 110 based on the first control signal and transmit the first control signal to the second controller 160 through the communication line 101. In addition, the second controller 160 may receive the first control signal from the first controller 150 and control the second inverter 120 depending on the first control signal. As a result, both the first inverter 110 and the second inverter 120 may be controlled based on the first control signal.

In a second case, both the first inverter 110 and the second inverter 120 may be controlled based on the second control signal. As described above, the second controller 160 generates the second control signal based on information detected in the current sensor 140. In this case, the second controller 160 may control the second inverter 120 based on the second control signal and transmit the second control signal to the first controller 150 through the communication line 101. In addition, the first controller 150 may receive the second control signal from the second controller 160 and control the first inverter 110 depending on the second control signal. As a result, both the first inverter 110 and the second inverter 120 may be controlled based on the second control signal.

In an exemplary embodiment of the present disclosure, in a first condition, the first controller 150 and the second controller 160 may respectively control the first inverter 110 and the second inverter 120 depending on the first control signal, and in a second condition, the first controller 150 and the second controller 160 may respectively control the first inverter 110 and the second inverter 120 depending on the second control signal. In other words, when the first condition is met, the first inverter 110 and the second inverter 120 may be controlled based on the first control signal as in the first case described above. In addition, when the second condition is met, the first inverter 110 and the second inverter 120 may be controlled based on the second control signal as in the second case described above.

Figure 2:
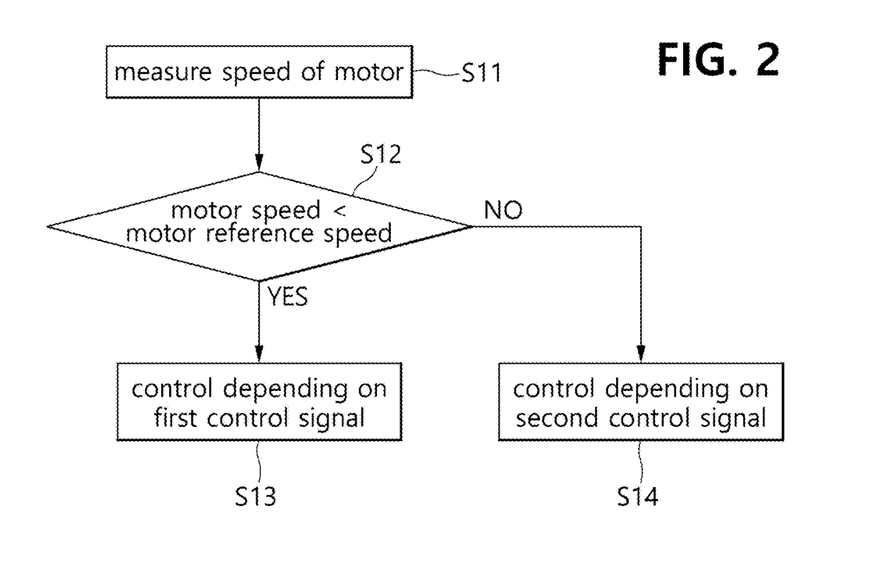
FIG. 2 is a flowchart of an example of control process of motor by a device for controlling a motor for a vehicle according to an exemplary embodiment of the present disclosure.

FIG. 2 is a flowchart of an example of control process of motor by a device for controlling a motor for a vehicle according to an exemplary embodiment of the present disclosure.

Referring to FIG. 2, the first condition and the second condition may be related to a speed of the motor 10. More specifically, the first condition may be a case in which a speed of the motor 10 is less than a reference speed of the motor, and the second condition may be a case in which a speed of the motor 10 is greater than or equal to the reference speed of the motor. Here, both the speed of the motor 10 and the motor reference speed may refer to a rotation speed of the motor.

When the speed of the motor 10 corresponds to a high-speed operation area where a counter electromotive force is sufficiently large, the detection information by the current sensor 140 may provide satisfactory estimation characteristics of the state of the motor 10. On the other hand, when the speed of the motor 10 is not sufficiently large, for example, when the speed of the motor 10 is relatively small (for example, when the speed of the motor 10 is less than 10% of the rated speed of the motor), the counter electromotive force may be insignificant, and thus it may be difficult to make satisfactory estimation of the state of the motor 10 based on the detection information by the current sensor 140.

Considering this, when it is determined that the speed of the motor 10 is large enough that the detection information by the current sensor 140 may provide satisfactory estimation characteristics of the state of the motor 10, the detection information of the current sensor 140 is used to control the first inverter 110 and the second inverter 120. On the other hand, when it is determined that the speed of the motor 10 is not large enough that the detection information by the current sensor 140 may provide satisfactory estimation characteristics of the state of the motor 10, the detection information of the motor position sensor 130 may be used to control the first inverter 110 and the second inverter 120.

For example, the reference speed of the motor may be set at any speed ranging from 5% to 15% of a rated speed of the motor 10. More specifically, the motor reference speed may be set at 10% of the rated speed of the motor.

A control process of a motor shown in FIG. 2 is described in detail as follows.

First, a speed of a motor 10 is measured (Step 11). As described above, the speed of the motor 10 means a rotational speed of the motor. For example, the speed of the motor 10 may be measured by the motor position sensor 130.

Next, the speed of the motor 10 is compared with a motor reference speed (Step 12). That is, it is determined whether the speed of the motor 10 is less than the motor reference speed or whether the speed of the motor 10 is greater than or equal to the motor reference speed. At this time, a case in which the speed of the motor 10 is less than the motor reference speed corresponds to the first condition, and a case in which the speed of the motor 10 is greater than or equal to the motor reference speed corresponds to the second condition.

The comparing the speed of the motor 10 with the motor reference speed may be performed by the first controller 150 or the second controller 160. Meanwhile, an electronic control unit (not shown) other than the first controller 150 or the second controller 160 may compare the speed of the motor 10 with the motor reference speed. In this case, the other electronic control unit may transmit an instruction to perform control of the first inverter 110 and the second inverter 120 to the first controller 150 and the second controller 160 based on the first control signal or the second control signal.

Next, in the first condition, for example, when the speed of the motor 10 is less than the motor reference speed, both the first inverter 110 and the second inverter 120 may be controlled based on the first control signal (Step 13).

Meanwhile, in the second condition, for example, when the speed of the motor 10 is greater than or equal to the motor reference speed, both the first inverter 110 and the second inverter 120 are controlled based on the second control signal (Step 14).

Figure 3:
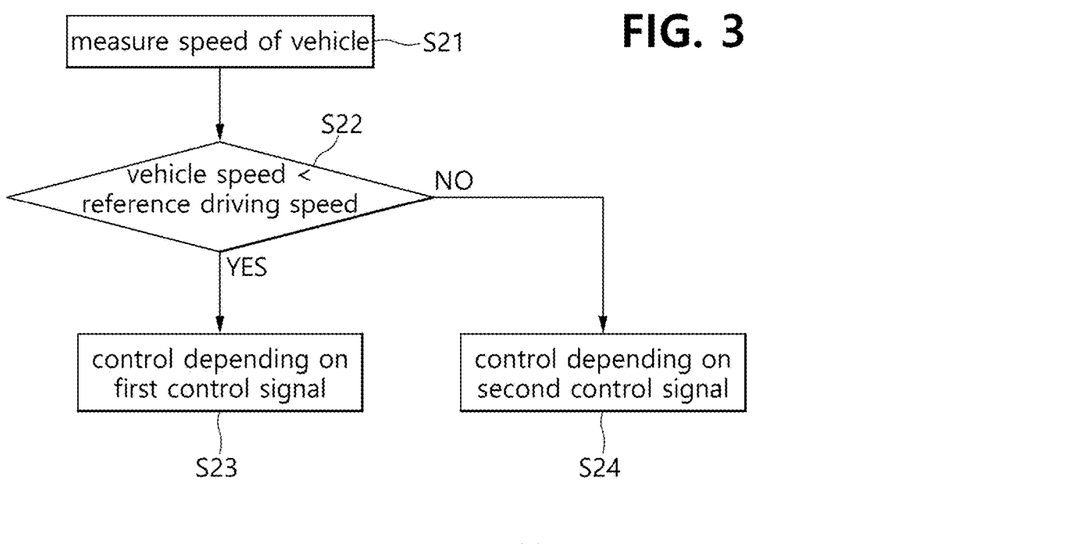
FIG. 3 is a flowchart of another example of control process of motor by a device for controlling motor for a vehicle according to an exemplary embodiment of the present disclosure.

FIG. 3 is a flowchart of another example of control process of motor by a device for controlling motor for a vehicle according to an exemplary embodiment of the present disclosure.

Referring to FIG. 3, the first condition and the second condition may be related to a driving speed of the vehicle. More specifically, the first condition may be a case in which the speed of the vehicle is less than a reference driving speed, and the second condition may be a case in which the driving speed of the vehicle is greater than or equal to the reference driving speed.

When the speed of the vehicle corresponds to a high-speed operation area, the detection information by the current sensor 140 may provide satisfactory estimation characteristics of the state of the motor 10. On the other hand, when the speed of the vehicle is not sufficiently large, it may be difficult to make satisfactory estimation of the state of the motor 10 based on the detection information by the current sensor 140.

Considering this, when it is determined that the speed of the vehicle is large enough that the detection information by the current sensor 140 may provide satisfactory estimation characteristics of the state of the motor 10, the detection information of the current sensor 140 is used to control the first inverter 110 and the second inverter 120. On the other hand, when it is determined that the speed of the vehicle is not large enough that the detection information by the current sensor 140 may provide satisfactory estimation characteristics of the state of the motor 10, the detection information of the motor position sensor 130 may be used to control the first inverter 110 and the second inverter 120.

The reference driving speed may be set to a predetermined vehicle speed. More specifically, the reference driving speed may be set to 50 km or more. For example, the reference driving speed may be set in a range of 50 km to 100 km. In order that the first control signal is utilized among driving of the vehicle as long as it is not special situation, the reference driving speed may be set to a speed greater than or equal to 200 km.

A control process of the motor shown in FIG. 3 is described in detail as follows.

First, a speed of a vehicle (not shown) is measured (Step 21). For example, the speed of the vehicle may be measured by a vehicle speed sensor (not shown) installed in the vehicle.

Next, the speed of the vehicle is compared with a reference driving speed (Step 22). That is, it is determined whether the speed of the vehicle is less than the reference driving speed or whether the speed of the vehicle is greater than or equal to the reference driving speed. At this time, a case in which the speed of the vehicle is less than the reference driving speed corresponds to the first condition, and a case in which the speed of the vehicle is greater than or equal to the reference driving speed corresponds to the second condition.

The comparing the speed of the vehicle with the reference driving speed may be performed by the first controller 150 or the second controller 160. Meanwhile, any other electronic control unit (not shown), not the first controller 150 or the second controller 160, may compare the speed of the vehicle with the reference driving speed. In this case, the other electronic control unit may transmit an instruction to perform control the first inverter 110 and the second inverter 120 to the first controller 150 and the second controller 160 based on the first control signal or the second control signal.

Next, in the first condition, for example, when the speed of the vehicle is less than the reference driving speed, both the first inverter 110 and the second inverter 120 are controlled based on the first control signal (Step 23).

Meanwhile, in the second condition, for example, when the speed of the vehicle is greater than or equal to the reference driving speed, both the first inverter 110 and the second inverter 120 are controlled based on the second control signal (Step 24).

Figure 4:
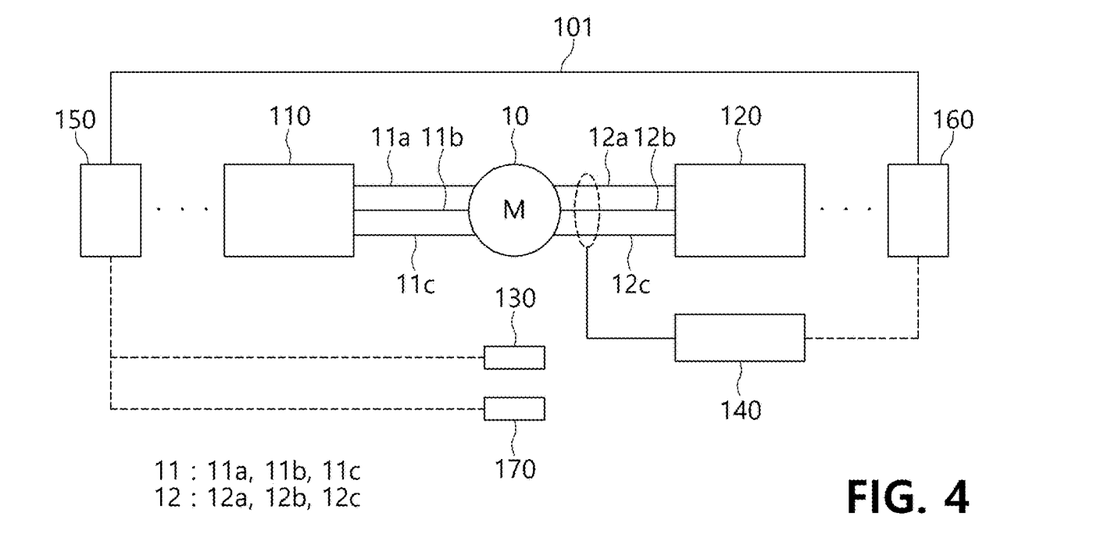
FIG. 4 is a diagram showing a configuration in which an shock sensor is further included in a device for controlling a motor for a vehicle according to an exemplary embodiment of the present disclosure.

FIG. 4 is a diagram showing a configuration in which an shock sensor is further included in a device for controlling a motor for a vehicle according to an exemplary embodiment of the present disclosure.

Referring to FIG. 4, a device 100 for controlling a motor for a vehicle according to an exemplary embodiment of the present disclosure may further include an shock sensor 170. The shock sensor 170 detects an impact force applied to the motor position sensor 130.

If an impact force having a predetermined magnitude or more is detected by the shock sensor 170, it means that a significant impact force has been applied to the motor position sensor 130. In this case, it is difficult to expect a normal operation of the motor position sensor 130, so the detection information of the motor position sensor 130 may be considered inaccurate.

When it is determined that it is difficult to trust the accuracy of the detection information of the motor position sensor 130 as described above, it is preferable that the control of the first inverter 110 and the second inverter 120 is performed based on the detection information of the current detection unit 140.

Figure 5:
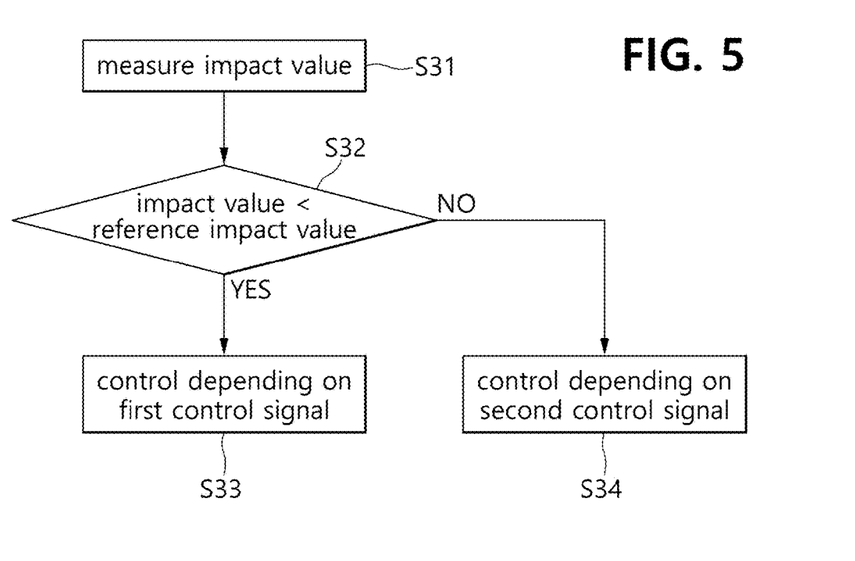
FIG. 5 is a flowchart of another example of control of motor by a device for controlling a motor for a vehicle according to an exemplary embodiment of the present disclosure.

FIG. 5 is a flowchart of another example of control of motor by a device for controlling a motor for a vehicle according to an exemplary embodiment of the present disclosure.

Referring to FIG. 5, the first condition and the second condition may be related to an impact value detected by the shock sensor 170. More specifically, the first condition may be a case in which the impact force detected by the shock sensor 170 is less than a reference impact value, and the second condition may be a case in which the impact force detected by the shock sensor 170 is greater than or equal to the reference impact value.

A control process of the motor shown in FIG. 5 is described in detail as follows.

First, the shock sensor 170 measures an impact value applied to the motor position sensor 130 (Step 31). The impact value measured by the shock sensor 170 may serve as a criterion for determining whether the detection information of the motor position sensor 130 is reliable.

Next, the detection information of the shock sensor 170 is compared with the reference impact value (Step 32). That is, it is determined whether the impact value is less than the reference impact value or the impact value is greater than or equal to the reference impact value. At this time, a case in which the impact value is less than the reference impact value corresponds to the first condition, and when a case in which the impact value is greater than or equal to the reference impact value corresponds to a second condition.

The comparing the impact value with the reference impact value may be performed by the first controller 150 or the second controller 160. Meanwhile, another electronic control unit (not shown) other than the first controller 150 or the second controller 160 may compare the impact value with the reference impact value. In this case, the other electronic control unit may transmit an instruction to perform control the first inverter 110 and the second inverter 120 to the first controller 150 and the second controller 160 based on the first control signal or the second control signal.

Next, in the first condition, for example, when the impact value is less than the reference impact value, both the first inverter 110 and the second inverter 120 are controlled based on the first control signal (Step 33).

Meanwhile, in the second condition, for example, when the impact value is greater than or equal to the reference impact value, both the first inverter 110 and the second inverter 120 are controlled based on the second control signal (Step 34).

Figure 6:
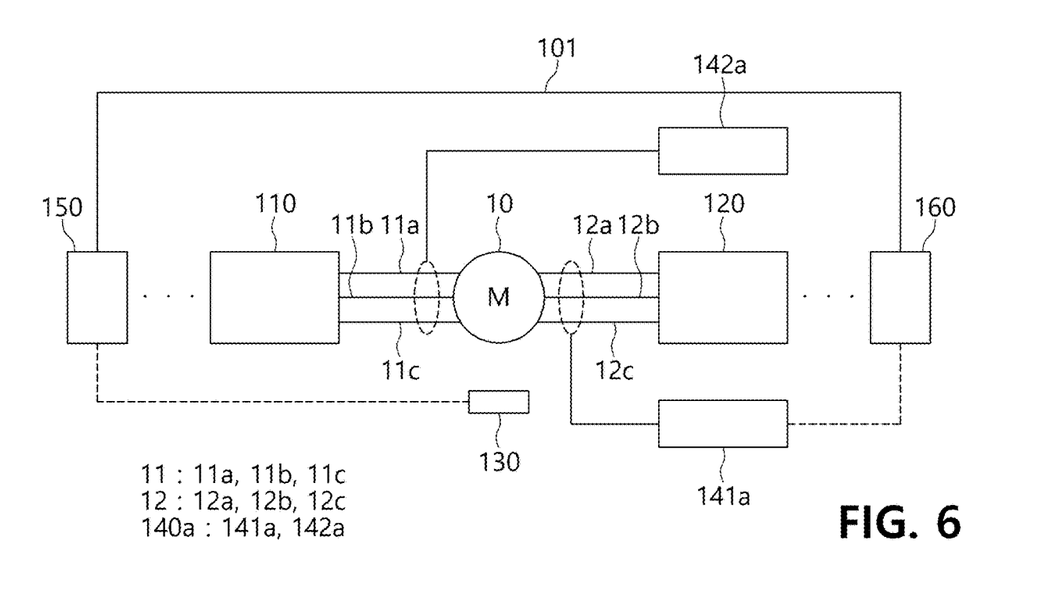
FIG. 6 is a diagram showing a configuration of a device for controlling a motor for a vehicle according to a modified example of an exemplary embodiment of the present disclosure.

FIG. 6 is a diagram illustrating a configuration of a device for controlling a motor for a vehicle according to a modified example of an exemplary embodiment of the present disclosure.

Referring to FIG. 6, a current sensor 140A may be configured to detect both a current output from the first inverter 110 to the motor 10 and a current output from the second inverter 120 to the motor 10. More specifically, in a modified example of an exemplary embodiment of the present disclosure, the current sensor 140A includes a first sub current sensor 141A for detecting a current output from the first inverter 110 to the motor 10 and a second sub current sensor 142A for detecting a current output from the second inverter 120 to the motor 10.

The first sub current sensor 141A may detect a current output from the first inverter 110 to the motor 10, for example, a first three-phase AC current supplied to the first U-phase 11A coil, the first V-phase 11B coil, and the first W-phase 11C coil. In addition, the second sub current sensor 142A may detect a current output from the second inverter 120 to the motor 10, for example, a second three-phase AC current supplied to the second U-phase 12A coil, the second V-phase 12B coil, and the second W-phase 12C coil.

The first sub current sensor 141A and the second sub current sensor 142A may be configured as a circuit for amplifying or computing a continuous analog signal. For example, the first sub current sensor 141A and the second sub current sensor 142A may include an operation amplifier (OP AMP), respectively. In addition, the first sub current sensor 141A and the second sub current sensor 142A may include a shunt resistor which is a resistor used to measure current.

According to a modified exemplary embodiment of the present disclosure, the second control signal may be generated in a state in which both the current output from the first inverter 110 to the motor 10 and the current output from the second inverter 120 to the motor 10 are considered. Accordingly, the second control signal may be generated based on more accurate feedback information about the current state of the motor 10.

Figure 7:
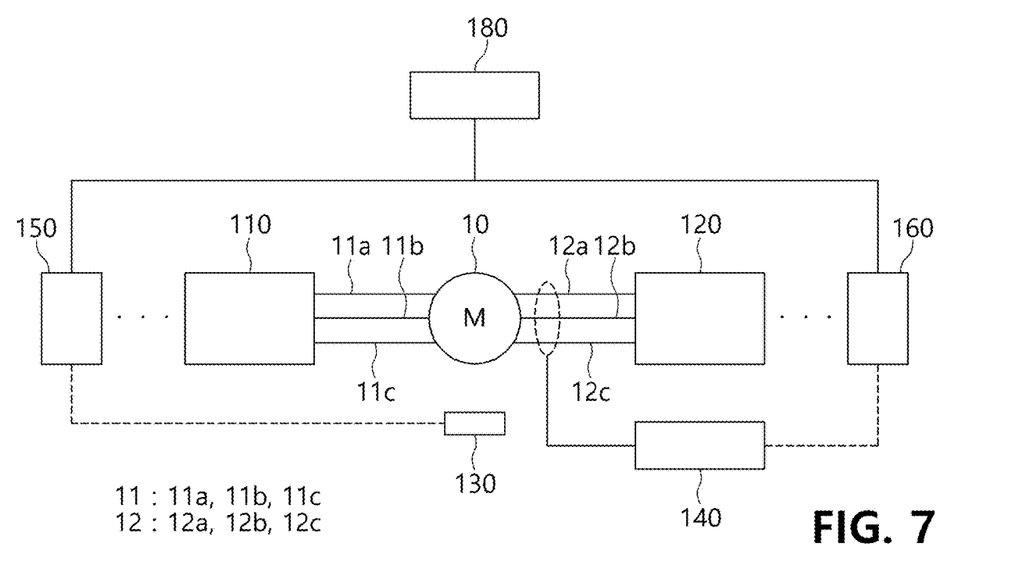
FIG. 7 is a diagram showing a configuration of a case in which an output controller is further included in a device for controlling a motor for a vehicle according to an exemplary embodiment of the present disclosure.

FIG. 7 is a diagram showing a configuration of a case in which an output controller is further included in a device for controlling a motor for a vehicle according to an exemplary embodiment of the present disclosure.

Referring to FIG. 7, the device 100 for controlling a motor for a vehicle according to an exemplary embodiment of the present disclosure may further include an output controller 180. The output controller 180 determines whether the first controller 150 and the second controller 160 fail, and adjusts the outputs of the first winding 11 and the second winding 12.

The output controller 180 of the device 100 according to an exemplary embodiment of the present disclosure may be a processor (e.g., computer, microprocessor, CPU, ASIC, circuitry, logic circuits, etc.). The output controller 180 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The output controller 180 may generate an output adjustment signal to increase the output of the winding powered by the inverter controlled by a normal controller when any one of the first controller 150 and the second controller 160 fails and the other one is normal. Specifically, when the first controller 150 fails and the second controller 160 is normal, the output controller 180 may generate an output adjustment signal to increase the output of the second winding 12 supplied with power by the second inverter 120 controlled by the second controller 160. On the contrary, when the first controller 150 is normal and the second controller 160 fails, the output controller 180 may generate an output adjustment signal to increase the output of the first winding 11 supplied with power by the first inverter 110 controlled by the first controller 150.

When both the first controller 150 and the second controller 160 are normal, each of the first winding 11 and the second winding 12 may be responsible for a half of the output of the motor 10. In other words, the first inverter 110 may supply a half of the output of the motor 10, and the second inverter 120 may supply the other half of the output of the motor 10.

In this situation, when any one of the first controller 150 and the second controller 160 fails, the output of the motor 10 decreases to half. If the motor 10 is applied to a hydraulic pump supplying braking hydraulic pressure, the braking force decreases as the output of the motor 10 decreases, which leads to deterioration in safety of the vehicle.

To solve this problem, the output controller 180 may generate an output adjustment signal to increase the output of the winding supplied with power by an inverter controlled by the controller that is normal among the first controller 150 and the second controller 160. The output loss of the motor 10 may be recovered to a predetermined level by adjusting the output of the output controller 180 as described above.

In an exemplary embodiment of the present disclosure, the output controller 180 may accumulatively store the failure rates of the first controller 150 and the second controller 160 during a predetermined period. In addition, the output controller 180 may adjust an output sharing ratio between the first controller 150 and the second controller 160 according to the failure rates of the first controller 150 and the second controller 160 after the lapse of the predetermined period.

The output controller 180 may adjust the output sharing ratio of the first controller 150 and the output sharing ratio of the second controller 160 by considering the difference between the failure rates of the first controller 150 and the second controller 160 after the lapse of the predetermined period. More specifically, the output controller 180 may adjust the output sharing ratio of the first controller 150 and the output sharing ratio of the second controller 160 in proportion to the difference between the failure rates of the first controller 150 and the second controller 160 after the lapse of the predetermined period.

For example, when the failure rate of the first controller 150 identified during the predetermined period is 5%, and the failure rate of the second controller 160 is 15%, the failure rates of the first controller 150 and the second controller 160 differ by 10%. That is, the failure rate of the second controller 160 is 10% higher than that of the first controller 150. Conversely, the failure rate of the first controller 150 is 10% lower than that of the second controller 160.

In this situation, the output controller 180 may adjust the output so that the first controller 150 is responsible for 10% more of the output of the motor 10 than the second controller 160. In other words, the output controller 180 may adjust the output such that the output of the first winding 11 supplied with power by the first inverter 110 controlled by the first controller 150 is 10% higher than the output of the second winding 12 supplied with power by the second inverter 120 controlled by the second controller 160. When the output is adjusted as described above and the total output of the motor 10 is set to 100%, the first winding 11 may be responsible for 55% of the total output and the second winding 12 may be responsible for 45% of the total output.

The above described contents related to the adjustment of the output sharing ratio by the output controller 180 are merely examples. The output controller 180 may adjust the output sharing ratios of the first controller 150 and the second controller 160 by considering other factors in addition to the failure rates of the first controller 150 and the second controller 160. In addition, the output controller 180 may adjust the output sharing ratios of the first controller 150 and the second controller 160 according to the failure rates of the first controller 150 and the second controller 160, but may adjust the output sharing ratios of the first controller 150 and the second controller 160 according to adjustment criteria (or methods) different from the above-described examples.

As described above, the device for controlling a motor for a vehicle according to the present disclosure may combine advantages of sensor control using the motor position sensor 130 for detecting a rotational position or a rotational speed of the motor 10 and advantages of sensorless control in which the motor is controlled based on detection information of a current supplied to the motor regardless of detection information of the motor position sensor.

According to the present disclosure, motor control using the detection information of the motor position sensor 130 can be performed in a situation in which motor control based on the detecting information of the motor position sensor is more reliable (e.g., when the rotational speed of the motor is equal to or less than the reference rotational speed of the motor, when the speed of the vehicle is equal to or less than the reference driving speed, and the like). In addition, in a situation in which motor control based on the detection information of current supplied to the motor is reliable (e.g., when a rotational speed of the motor exceeds a reference rotational speed of the motor, when a speed of the vehicle exceeds a reference driving speed, when an impact force is applied to the motor position sensor greater than a reference impact value, and the like), sensorless motor control based on current detection information may be performed rather than the detection information of the motor position sensor.

In addition, according to the present disclosure, when a motor includes a first winding and a second winding, each winding is powered by a separate inverter, and each inverter is controlled by a separate controller, a motor position sensor does not need to be arranged to correspond to each inverter. That is, there is no need to be two motor position sensors arranged, and it is sufficient to arrange only one motor position sensor. Accordingly, the number of motor position sensors relatively expensive may be reduced. Further, a space around the motor is required for the arrangement of the motor position sensor. However, according to the present disclosure, since only one motor position sensor is needed, space efficiency may be improved. As described above, according to the present disclosure, economic efficiency and space efficiency may be improved.

Further, according to the present disclosure, redundancy may be secured so that a motor output of a predetermined level or more may be maintained even when any one of the first controller for controlling the first inverter and the second controller for controlling the second inverter fails. Accordingly, reliability of the operation of the motor may be improved.

According to the above configuration, the device for controlling a motor for a vehicle according to the present disclosure may improve economic efficiency and accuracy of motor control by performing control of an inverter based on the detection information of the motor position sensor or the detection information of the current sensor according to conditions.

In addition, the device for controlling a motor for a vehicle according to the present disclosure may effectively achieve redundancy of motor control by adjusting the output of the dual winding through the output controller.

It should be understood that the effects of the present disclosure are not limited to the above-described effects and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A device for controlling a motor for a vehicle, the device comprising:
   a first inverter for supplying power to a first winding wound to the motor;
   a second inverter for supplying power to a second winding wound to the motor;
   a motor position sensor for detecting at least one of a rotational position or a rotational speed of the motor by being mounted to the motor;
   a current sensor for detecting at least one of a current output from the first inverter to the motor or a current output from the second inverter to the motor;
   a first controller for controlling the first inverter; and
   a second controller for controlling the second inverter,
   wherein the first controller is configured to generate a first control signal based on the at least one of the rotational position or the rotational speed of the motor detected by the motor position sensor, and the second controller is configured to generate a second control signal based on the at least one of the current output from the first inverter to the motor or a current output from the second inverter to the motor detected by the current sensor,
   the first controller and the second controller are configured to communicate with each other, and
   the first controller and the second controller are configured to respectively control the first inverter and the second inverter depending on the first control signal, or to respectively control the first inverter and the second inverter depending on the second control signal,
   wherein in a first condition, the first controller and the second controller are configured to respectively control the first inverter and the second inverter depending on the first control signal, and
   in a second condition, the first controller and the second controller are configured to respectively control the first inverter and the second inverter depending on the second control signal.

2. The device of claim 1, wherein the first condition and the second condition are related to a speed of the motor.

3. The device of claim 2, wherein the first condition includes a case in which the speed of the motor is less than a reference speed of the motor, and the second condition includes a case in which the speed of the motor is greater than or equal to the reference speed of the motor.

4. The device of claim 3, wherein the reference speed of the motor is set at any speed ranging from 5% to 15% of a rated speed of the motor.

5. The device of claim 1, wherein the first condition and the second condition are related to a driving speed of the vehicle.

6. The device of claim 5, wherein the first condition includes a case in which the driving speed of the vehicle is less than a reference driving speed, and the second condition includes a case in which the driving speed of the vehicle is greater than or equal to the reference driving speed.

7. The device of claim 6, wherein the reference driving speed is set to 50 km or more.

8. The device of claim 1, further comprising: a shock sensor for detecting an impact force applied to the motor position sensor.

9. The device of claim 8, wherein the first condition includes a case in which the impact force detected by the shock sensor is less than a reference impact value, and the second condition includes a case in which the impact force detected by the shock sensor is greater than or equal to the reference impact value.

* * * * *